United States Patent Office 2,978,476
Patented Apr. 4, 1961

2,978,476
NITRAZA DIISOCYANATES

Karl Klager, Sacramento, and Clinton R. Vanneman, Claremont, Calif., assignors to Aerojet-General Corporation, Azusa, Calif., a corporation of Ohio No Drawing. Filed Dec. 13, 1957, Ser. No. 702,735

12 Claims. (Cl. 260—453)

This invention relates to new compositions of matter and a method for their preparation. In particular, it relates to nitraza diisocyanates having the general formula:

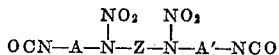

wherein A and A′ are alkylene radicals which may be the same or different and Z is a nitroalkylene radical.

The diisocyanates of this invention react with polyalcohols such as 5,5-dinitro-1,2-hexanediol, in the presence of a catalyst, such as ferric acetylacetonate, to yield high molecular weight polyurethane compositions useful as solid propellants, according to the method disclosed in assignee's copending U.S. patent application Serial No. 423,545, filed April 15, 1954, now abandoned. These polyurethanes can be used as a primary propulsion source in sprocket-propelled vehicles, and can also be used as a propellant for artillery missiles. When used as the primary propulsion source for rocket vehicles, they can be conveniently ignited by a conventional igniter, as, for example, the igniter disclosed in assignee's copending patent application Serial No. 306,030, filed August 23, 1952. The propellant is preferably cast in tubular form and restricted in the conventional manner with a relatively inert resin, such as a non-nitrated polyurethane foam or a polyester resin, and placed inside a chamber having one end open and leading into a conventional venturi rocket nozzle. Upon ignition, large quantities of gases are produced and exhausted through the nozzle, creating propulsive force.

The compounds of this invention are prepared by reacting their corresponding diacyl halides with an azide of an alkali or alkaline earth metal, such as sodium, potassium or magnesium azide, to form the corresponding azide, and subsequently or simultaneously heating under anhydrous conditions to effect rearrangement to the desired diisocyanate, as illustrated by the general reaction scheme set forth below:

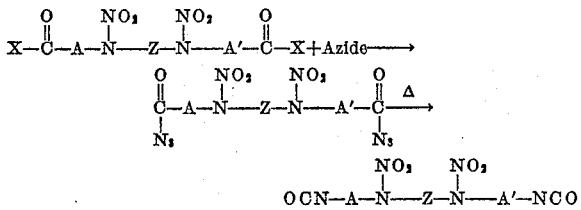

wherein X is a halogen radical; A and A′ are alkylene radicals which may be the same or difficult; and Z is a nitroalkylene radical.

The acid halides employed as starting materials in the above reaction are obtained by reacting the corresponding acids with a thionyl halide such as thionyl chloride. The acids, such as 4,7,7,10-tetranitro-4,10-diaza-1,13-tridecanedioic acid, are usually obtained by hydrolyzing gem-dinitro-dinitraza-dinitriles, such as 4,7,7,10-tetranitro-4,10-diaza-1,13-tridecane dinitrile, as disclosed in our copending U.S. patent application Serial No. 532,731, filed September 6, 1955. Certain acids of this series, such as, for example, 3,5,5,7-tetranitro-3,7-diaza-1,9-nonanedioic acid, may be prepared by condensing amino esters with 2,2-dinitro-1,3-propanediol and reacting the condensation product with nitric acid.

To more clearly illustrate the invention, the following example is presented. It is to be understood, however, that this example is presented merely as a means of illustration and is not intended to limit the scope of the invention in any way.

EXAMPLE

*Preparation of 3,6,6,9-tetranitro-3,9-diazo-1,11-undecane diisocyanate*

A solution of 11 gm. (0.0238 mole) 4,7,7,10-tetranitro-4,10-diaza-1,13-tridecanedioyl chloride in 50 ml. acetone was added dropwise to a solution of 4.6 gm. (0.071 mole) sodium azide in 15 ml. water at 5° C. The resulting suspension was stirred for 1 hour at 0° C. and filtered. The residue was then washed with ice water. Ethylene dichloride was added and the water was removed by an azeotropic distillation under reduced pressure. The residual suspension was warmed on the steambath at atmospheric pressure. The resulting solution was concentrated by partial distillation under reduced pressure. The mixture was chilled and dry ether was added. The resulting precipitate was collected by filtration and washed with absolute ether. The 3,6,6,9-tetranitro-3,9-diaza-1,11-undecane diisocyanate, M.P. 88–90° C., was recrystallized from chloroform solution. The elemental analysis of the product is as follows: Calculated for $C_{11}H_{16}O_{10}N_8$: percent C., 31.43; percent H, 3.84; percent N, 26.66. Found: percent C, 31.47; percent H, 3.88; percent N, 26.77.

Reaction temperature is not critical in the practice of this invention although a relatively low temperature, such as from about 0° to about 5° C., is preferred for optimum control of the reaction. Higher or lower temperatures, outside of this range, can be employed within the scope of the invention, the only significant effect of temperature variation being a corresponding increase or decrease in reaction rate. By the same token, the temperature at which the azide is converted to the diisocyanate by rearrangement is not critical. All that is required is that at least some heat be supplied.

Due to convenience and cost, it is preferred to employ the gem-dinitro-dinitraza diacyl chlorides as starting materials for the preparation of the diisocyanates of this invention.

It will be appreciated that a wide variety of dinitraza diisocyanates can be prepared in accordance with the method of our invention. For example, 4,8,8,12-tetranitro-4,12-diaza-1,15-pentadecanedioyl bromide; 3,6,6,9-tetranitro-3,9-diaza-1,11-undecanedioyl iodide; and 3,6,6,10-tetranitro-3,10-diaza-1,15-pentadecanedioyl fluoride react with an alkali or alkaline earth metal azide, such as sodium or magnesium azide, to produce their corresponding azides which upon heating, as taught herein, rearrange to form the following diisocyanates, respectively: 3,7,7,11-tetranitro-3,11-diaza-1,13-tridecane diisocyanate; 2,5,5,8-tetranitro-2,8-diaza-1,9-nonane diisocyanate; and 2,5,5-9-tetranitro-2,9-diaza-1,13-tridecane diisocyanate. Also, 3,5,8-trinitro-3,8-diaza-1,11-undecanedioyl chloride and 4,6,6,9,11-pentanitro-4,11-diaza-1,13-tridecanedioyl bromide react with an azide such as potassium azide to produce their corresponding azides which, upon heating, rearrange to form 2,4,7-trinitro-2,7-diaza-1,9-nonane diisocyanate and 3,5,5,8,10-pentanitro-3,10-diaza-1,11-undecane diisocyanate, respectively.

It is apparent that any member of this series may be prepared by merely selecting the appropriate diacyl halide, reacting it with a metallic azide, such as potassium azide, and heating under anhydrous conditions to effect rearrangement, in accordance with the teachings of this invention.

This application is a continuation in part of our copending U.S. patent application Serial No. 451,707, filed August 23, 1954, now abandoned.

We claim:

1. As compositions of matter, nitraza-diisocyanates having the general formula:

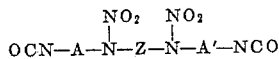

wherein A and A' are lower alkylene radicals and Z is a lower nitroalkylene radical.

2. As compositions of matter, the nitraza diisocyanates having the general formula:

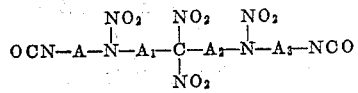

wherein A, $A_1$, $A_2$ and $A_3$ are lower alkylene radicals.

3. As a composition of matter, 3,6,6,9-tetranitro-3,9-diaza-1,11-undecane diisocyanate having the structural formula:

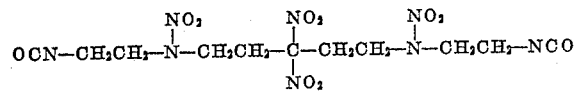

4. As a composition of matter, 3,7,7,11-tetranitro-3,11-diaza-1,13-tridecane diisocyanate having the structural formula:

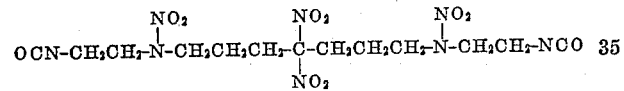

5. As a composition of matter, 2,5,5,8-tetranitro-2,8-diaza-1,9-nonane diisocyanate having the structural formula:

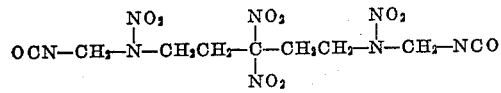

6. As a composition of matter, 2,5,5,9-tetranitro-2,9-diaza-1,13-tridecane diisocyanate having the structural formula:

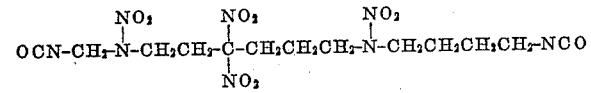

7. The method of preparing nitraza diisocyanates having the general formula:

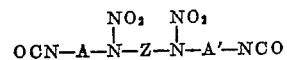

which comprises reacting a nitraza diacyl halide having the general formula:

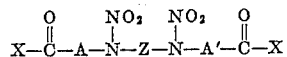

wherein X is a halogen radical; A and A' are lower alkylene radicals; and Z is a lower nitroalkylene radical; with an azide of an element selected from the group consisting of alkali and alkaline earth metals, and heating under anhydrous conditions to effect rearrangement.

8. The method of preparing nitraza diisocyanates having the general formula:

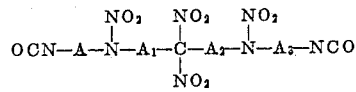

which comprises reacting a nitraza diacyl halide having the general formula:

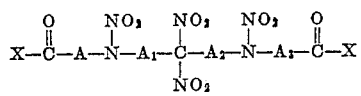

wherein X is a halogen radical and A, $A_1$, $A_2$ and $A_3$ are lower alkylene radicals; with an azide of an element selected from the group consisting of alkali and alkaline earth metals, and heating under anhydrous conditions to effect rearrangement.

9. The method of preparing 3,6,6,9-tetranitro-3,9-diaza-1,11-undecane diisocyanate which comprises reacting 4,7,7,10-tetranitro-4,10-diaza-1,13-tridecanedioyl chloride with sodium azide, in aqueous solution, and heating under anhydrous conditions to effect rearrangement.

10. The method of preparing 3,7,7,11-tetranitro-3,11-diaza-1,13-tridecane diisocyanate which comprises reacting 4,8,8,12-tetranitro-4,12-diaza-1,15-pentadecanedioyl bromide with an azide of an element selected from the group consisting of alkali and alkaline earth metals, and heating under anhydrous conditions to effect rearrangement.

11. The method of preparing 2,5,5,8-tetranitro-2,8-diaza-1,9-nonane diisocyanate which comprises reacting 3,6,6,9-tetranitro-3,9-diaza-1,11-undecanedioyl iodide with an azide of an element selected from the group consisting of alkali and alkaline earth metals and heating under anhydrous conditions to effect rearrangement.

12. The method of preparing 2,5,5,9-tetranitro-2,9-diaza-1,13-tridecane diisocyanate which comprises reacting 3,6,6,10-tetranitro-3,10-diaza-1,15-pentadecanedioyl fluoride with an azide of an element selected from the group consisting of alkali and alkaline earth metals, and heating under anhydrous conditions to effect rearrangement.

No references cited.